(12) United States Patent
Moe et al.

(10) Patent No.: US 11,814,929 B2
(45) Date of Patent: Nov. 14, 2023

(54) SUBSEA HYDROCARBON FLOWLINE SYSTEM AND RELATED METHOD AND USE

(71) Applicant: FMC Kongsberg Subsea AS, Kongsberg (NO)

(72) Inventors: Sigurd Moe, Kongsberg (NO); Rafael Taouil, Le Pecq (FR); Jonny Emil Andersson, Kongsberg (NO); Nicholas Gatherar, Midlothian (GB)

( * ) Notice: Subject to any disclaimer, the term of this patent is extended or adjusted under 35 U.S.C. 154(b) by 0 days.

(21) Appl. No.: 17/798,864

(22) PCT Filed: Feb. 8, 2021

(86) PCT No.: PCT/EP2021/052964
§ 371 (c)(1),
(2) Date: Aug. 10, 2022

(87) PCT Pub. No.: WO2021/160562
PCT Pub. Date: Aug. 19, 2021

(65) Prior Publication Data
US 2023/0108320 A1  Apr. 6, 2023

(30) Foreign Application Priority Data

Feb. 11, 2020 (NO) .................................. 20200170

(51) Int. Cl.
*E21B 36/04* (2006.01)
*F16L 53/38* (2018.01)
(Continued)

(52) U.S. Cl.
CPC ............ *E21B 36/04* (2013.01); *E21B 17/003* (2013.01); *E21B 17/028* (2013.01); *E21B 43/01* (2013.01); *E21B 47/001* (2020.05); *F16L 53/38* (2018.01)

(58) Field of Classification Search
CPC ...... E21B 36/04; E21B 17/003; E21B 17/028; E21B 43/01; E21B 47/001; F16L 53/38
See application file for complete search history.

(56) References Cited

U.S. PATENT DOCUMENTS

| | | | |
|---|---|---|---|
| 5,256,844 A | 10/1993 | Grosvik et al. | |
| 5,979,506 A * | 11/1999 | Aarseth | F16L 9/19 138/33 |

(Continued)

FOREIGN PATENT DOCUMENTS

| | | | | |
|---|---|---|---|---|
| GB | 2582178 A * | 9/2020 | ........... | E21B 17/028 |
| GB | 2606213 A * | 11/2022 | ............... | F16L 53/38 |
| WO | WO-2017194550 A1 * | 11/2017 | ............... | F16L 53/38 |

OTHER PUBLICATIONS

Aarseth F. et al., "Heating of Pipelines, and Power Supply to Subsea Electrical Equipment," Deep Offshore Technology International Conference (Nov. 1, 1995).

*Primary Examiner* — James G Sayre

(57) ABSTRACT

A subsea hydrocarbon flowline system (300) is disclosed. The flowline system has a hydrocarbon flowline (302); an electric trace heating system (304) arranged along at least a part-length of the flowline to control the temperature of hydrocarbon fluid flowing in the flowline; and a power input connector (Pin) configured for receiving electrical power from an electrical power providing system for powering the electric trace heating system. The electric trace heating system has a first three-phase trace heating cable (C') and a second three-phase trace heating cable (C"), each trace heating cable extending between the power input connector and a cable termination (T'; T") where phase conduits (L1', L2', L3'; L1", L2", L3") of the trace heating cable are Y-connected and terminate in a neutral connection point ($L_N'$; $L_N''$). Further, the flowline system has a power output connector (Pout) for providing electrical power to a subsea (Continued)

hydrocarbon production system; a first electrical conduit (306') extending between the neutral connection point of the cable termination of the first trace heating cable and the power output connector; and a second electrical conduit (306") extending between the neutral connection point of the cable termination of the second trace heating cable and the power output connector, wherein the first and the second electrical conduits are electrically accessible at the power output connector for powering the subsea hydrocarbon production system.

14 Claims, 6 Drawing Sheets

(51) Int. Cl.
    *E21B 47/001*      (2012.01)
    *E21B 17/00*      (2006.01)
    *E21B 17/02*      (2006.01)
    *E21B 43/01*      (2006.01)

(56) References Cited

U.S. PATENT DOCUMENTS

| | | |
|---|---|---|
| 6,260,615 B1 | 7/2001 | Dalrymple et al. |
| 6,617,556 B1 | 9/2003 | Wedel |
| 10,704,727 B2 | 7/2020 | Pionetti et al. |
| 11,241,820 B2 | 2/2022 | Pionetti et al. |
| 2004/0134662 A1* | 7/2004 | Chitwood ............ E21B 33/126 166/369 |
| 2011/0143175 A1 | 6/2011 | Vyas et al. |
| 2017/0016565 A1 | 1/2017 | Tkaczyk et al. |
| 2017/0204701 A1 | 7/2017 | Mohammadi |

* cited by examiner

SUBSEA HYDROCARBON FLOWLINE SYSTEM AND RELATED METHOD AND USE

TECHNICAL FIELD

The present invention relates to a system and a method for providing electrical power to a subsea hydrocarbon production system. In particular, the present invention relates to a subsea hydrocarbon flowline system comprising an electric heat trace system that is utilized for providing such power.

BACKGROUND

In hydrocarbon processing systems comprising subsea hydrocarbon flowlines it is known to use electric heat trace systems to help solve flow assurance issues from subsea wellheads up to surface support facilities, in particular when dealing with viscous fluids, long subsea tiebacks; and for circumstances when the flowing conditions at the wellhead outlet (pressure, temperature, flow rate) are critical with respect to risks associated with hydrate and/or wax appearance.

One known subsea hydrocarbon flowline system having an electric heat trace system is disclosed in FIG. 1. This flowline system 10 comprises an inner flowline 12, an outer carrier pipe 14 and three-phase electric trace heating cables 16 installed in the annular space between the flowline 12 and the outer carrier pipe 14. The electric trace heating cables 16 are wound around the flowline 12 in a helical fashion. The inner flowline 12 and the outer carrier pipe 14 are kept concentric by means of spacers 18. An annular layer of insulation 20 may be arranged radially outside of the electric trace heating cables 16. A signal conduit 22, e.g. an optical fibre cable, may be arranged parallel to the electric trace heating cables 16 to convey temperature readings monitored along the length of the flowline 12 or act itself as a distributed temperature sensor.

The above-discussed technology is sometimes referred to as ETH-PiP technology (Electric Trace Heating—Pipe-in-Pipe) and is discussed in WO2017/182721A1 and WO2018/091814A1.

The working principle of the ETH-PiP technology relies on the Joule resistive effect, which brings active heating of the flowline through the three-phase electric trace heat cables. These cables are terminated in a single electrical point, where a Y or star connection is used and thus the sum of the three current phases is nil, thereby avoiding the need for a current returning path, unlike other active heating technologies.

U.S. Pat. No. 6,617,556B1 discloses a system for inductively heating a fluid conduit using an electrical cable located proximate a fluid conduit. Electricity is conducted to the cable in either a powering mode, in which a powered system is electrically coupled to the cable and substantially no inductive heating of the fluid conduit is provided, or a heating mode, in which the powered system is electrically decoupled from the cable and inductive heating of the fluid conduit is provided.

US2017/0016565A1 discloses a pipe-in-pipe (PIP) trace heating connection assembly in an annulus of a PIP pipeline comprising at least first and second conjoined PIP stalks having inner and outer pipes and said annulus thereinbetween. The first PIP stalk has a first trace heating cable located along its inner pipe, and the second PIP stalk has a second trace heating cable located along its inner pipe. The first and second heating cables have cable ends and heating cable terminals on the cable ends, and a flexible intermediate connecting cable having first and second intermediate terminals secured to the heating cable terminals of the first and second trace heating cables respectively to form a secured electrical pathway between the first and second trace heating cables.

US2011/0143175A1 discloses a method for providing auxiliary electrical power to an underwater well installation, the installation being linked to a surface location via an umbilical cable to supplement any electrical power received at the installation from the umbilical cable. The method comprises the steps of: providing power generation means at the installation; and providing an electrical power output line for transferring electrical power generated by the power generation means to the installation.

The present invention is directed to the advancement of hydrocarbon processing systems comprising subsea hydrocarbon flowlines having electric trace heating cables and, in particular, novel applications of such systems.

SUMMARY

According to a first example aspect, the present invention provides a subsea hydrocarbon flowline system comprising:
 a hydrocarbon flowline;
 an electric trace heating system arranged along at least a part-length of the flowline to control the temperature of hydrocarbon fluid flowing in the flowline; and
 a power input connector configured for receiving electrical power from an electrical power providing system for powering the electric trace heating system,
 wherein the electric trace heating system comprises:
 a first three-phase trace heating cable and a second three-phase trace heating cable, each trace heating cable extending between the power input connector and a cable termination where phase conduits of the trace heating cable are Y-connected and terminate in a neutral connection point.

The flowline system comprises:
 a power output connector for providing electrical power to a subsea hydrocarbon production system;
 a first electrical conduit extending between the neutral connection point of the cable termination of the first trace heating cable and the power output connector; and
 a second electrical conduit extending between the neutral connection point of the cable termination of the second trace heating cable and the power output connector,
 wherein the first and the second electrical conduits are electrically accessible at the power output connector for powering the subsea hydrocarbon production system.

Consequently, the trace heating cables of the electrical trace heating system of the subsea hydrocarbon flowline system are utilized to power the subsea production system connected to the power output connector, thus dispensing with a separate umbilical for the subsea production system and without adding any extra cables in the flowline.

The flowline system may comprise a signal conduit for providing control signals to and receiving control and/or monitoring signals from the subsea hydrocarbon production system, the signal conduit extending between and being accessible at the power input connector and the power output connector.

The signal conduit may also be utilized to convey temperature readings monitored along said part-length of the flowline. Also, the signal conduit may be utilised to convey other monitoring signals relating to the flowline, e.g. signals from vibration sensors and/or water ingress sensors arranged along said part-length of the flowline. Alternatively, the signal conduit may itself act as a distributed sensor, e.g. a distributed temperature sensor.

The flowline system may comprise a first signal conduit for providing control signals to and receiving control and/or monitoring signals from the subsea hydrocarbon production system and a second signal conduit for monitoring said part-length of the flowline.

Alternatively, the trace heating cables may be utilised to provide said control signals to and receive said control and/or monitoring signals from the subsea hydrocarbon production system. In such an embodiment the control and/or monitoring signals may be superimposed on the electrical power provided to the subsea hydrocarbon production system, thus eliminating the need for dedicated signal conduits for providing the control signals to and receiving the control and/or monitoring signals from the subsea hydrocarbon production system.

The flowline system may comprise a carrier pipe in which the flowline is arranged, and the first trace heating cable, the second trace heating cable, and, if present, the signal conduit, may be arranged in an annular space formed between the flowline and the carrier pipe.

Alternatively, the trace heating cables and/or the signal conduit may be arranged inside the flowline. In such a case, the carrier pipe may not be needed.

According to a second example aspect, the present invention provides a hydrocarbon processing system comprising:
a flowline system according to the first example aspect;
an electrical power providing system connected to said power input connector for providing electrical power to said electric trace heating system; and
a subsea production system connected to said power output connector,
wherein the subsea production system is configured for receiving electrical power from the electrical power providing system via said first and second electrical conduits.

The electrical power providing system may comprise:
a first three-phase power source for powering the first three-phase cable, wherein the first power source may be configured to form a Y-Y connection with the first trace heating cable;
a second three-phase power source for powering the second three-phase cable, wherein the second power source may be configured to form a Y-Y connection with the second trace heating cable; and
a single-phase power source arranged between neutral connection points of the first and second three-phase, Y-connected power sources.

The first trace heating cable may be configured for operating at a first neutral voltage level and the second trace heating cable may be configured for operating at a second neutral voltage level being different from the first neutral voltage level.

The difference between the neutral voltage level of the first trace heating cable and the neutral voltage level of the second trace heating cable may be an AC voltage (alternating current) or a DC voltage (direct current).

According to a third example aspect, the present invention provides a method of providing electrical power to a subsea hydrocarbon production system, comprising the steps of:
arranging a flowline system according to the first example aspect subsea;
connecting the power input connector of the flowline system to an electrical power providing system;
connecting the subsea hydrocarbon production system to the power output connector of the flowline system; and
providing electrical power to the subsea hydrocarbon production system from the electrical power providing system via the trace heating cables of the flowline system.

The method may comprise the step of providing control signals to and receiving control and/or monitoring signals from the subsea hydrocarbon production system via a signal conduit extending between and being accessible at the power input connector and power output connector.

According to a fourth example aspect, the present invention provides use of trace heating cables of an electrical trace heating system of a subsea hydrocarbon flowline system for powering a subsea hydrocarbon production system connected to a power output connector of the subsea hydrocarbon flowline system.

According to a fifth example aspect, the present disclosure provides a subsea hydrocarbon flowline system comprising:
a hydrocarbon flowline;
an electric trace heating system arranged along at least a part-length of the flowline to control the temperature of hydrocarbon fluid flowing in the flowline; and
a power input connector configured for receiving electrical power from an electrical power providing system for powering the electric trace heating system,
the electric trace heating system comprising at least one three-phase trace heating cable extending between the power input connector and a cable termination where phase conduits of the trace heating cable are Y-connected and terminate in a neutral connection point; and
the flowline system comprising a power output connector for providing electrical power to a subsea hydrocarbon production system, the power output connector being configured to receive electrical power from the power input connector via the at least one three-phase trace heating cable.

Above-discussed preferred and/or optional features of each aspect of the invention/disclosure may be used, alone or in appropriate combination, in the other aspects of the invention.

DESCRIPTION OF THE DRAWINGS

Following drawings are appended to facilitate the understanding of the present invention.

Figure 1:
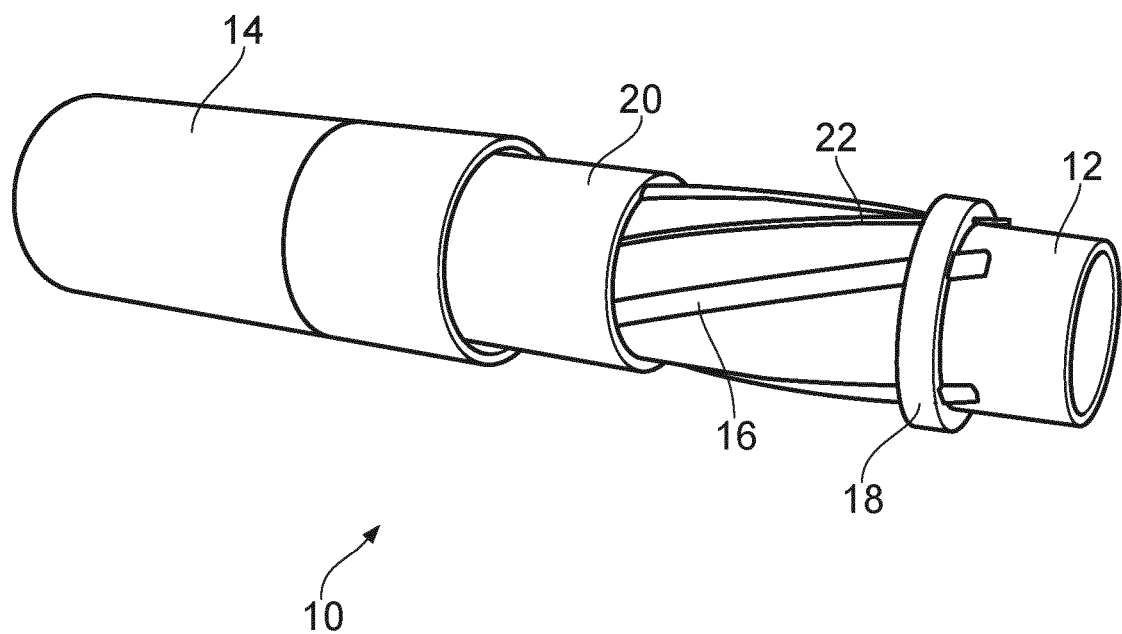
FIG. 1 discloses a prior art subsea hydrocarbon flowline system comprising a flowline and an electric trace heating system arranged along the flowline.

The drawings are not intended to limit the claimed invention to the specific subject-matter depicted therein. Other embodiments are possible within the scope of the invention as defined by the appended claims.

In the drawings, like reference numerals have been used to indicate common parts, elements or features unless otherwise explicitly stated or implicitly understood by the context.

DETAILED DESCRIPTION

Figure 2:
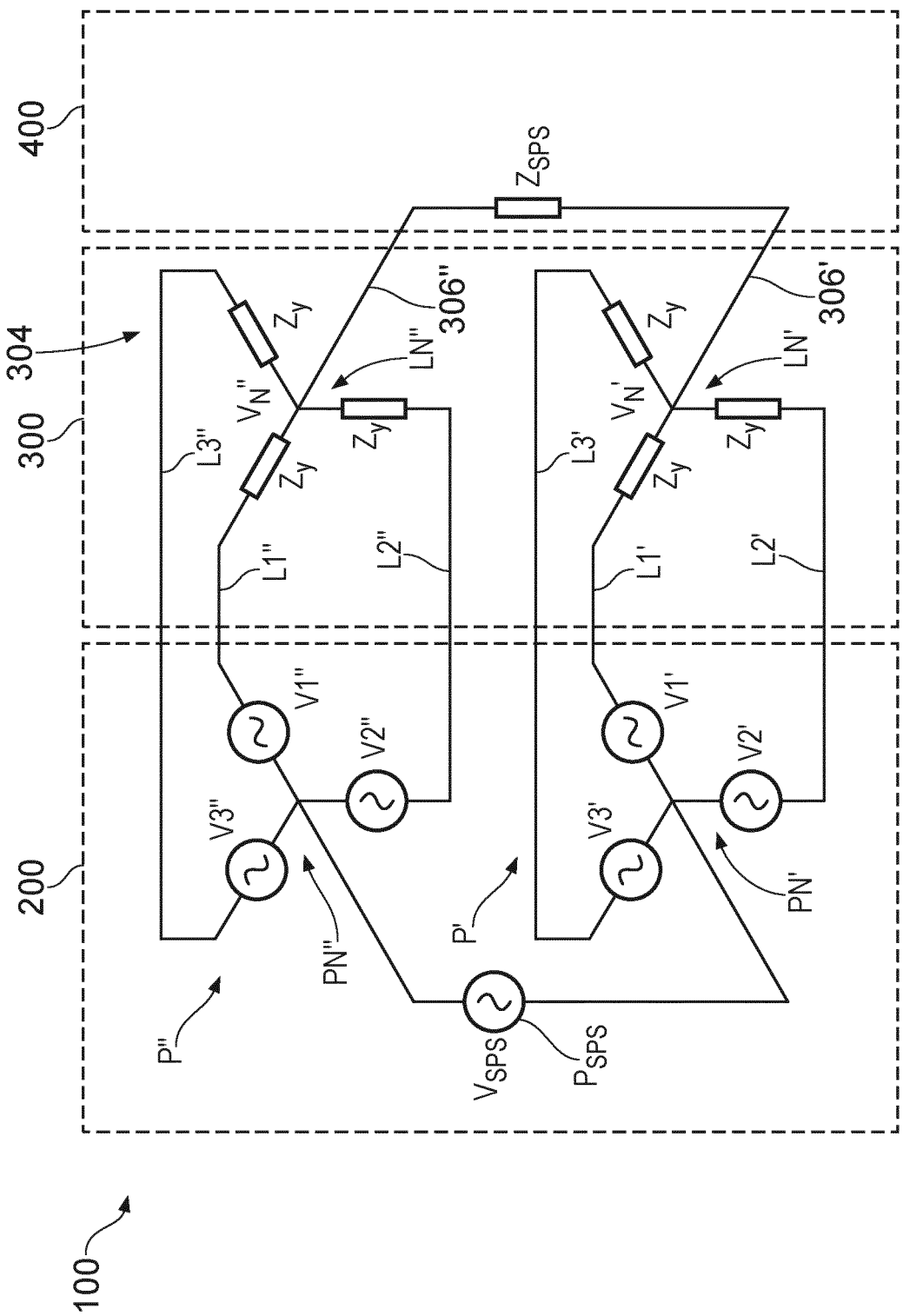
FIG. 2 illustrates, schematically, an embodiment of a hydrocarbon processing system according to an aspect of the invention.

FIG. 2 schematically illustrates a hydrocarbon processing system 100 that comprises an electrical power providing system 200, a subsea flowline system 300 and a subsea production system 400.

Figure 3:
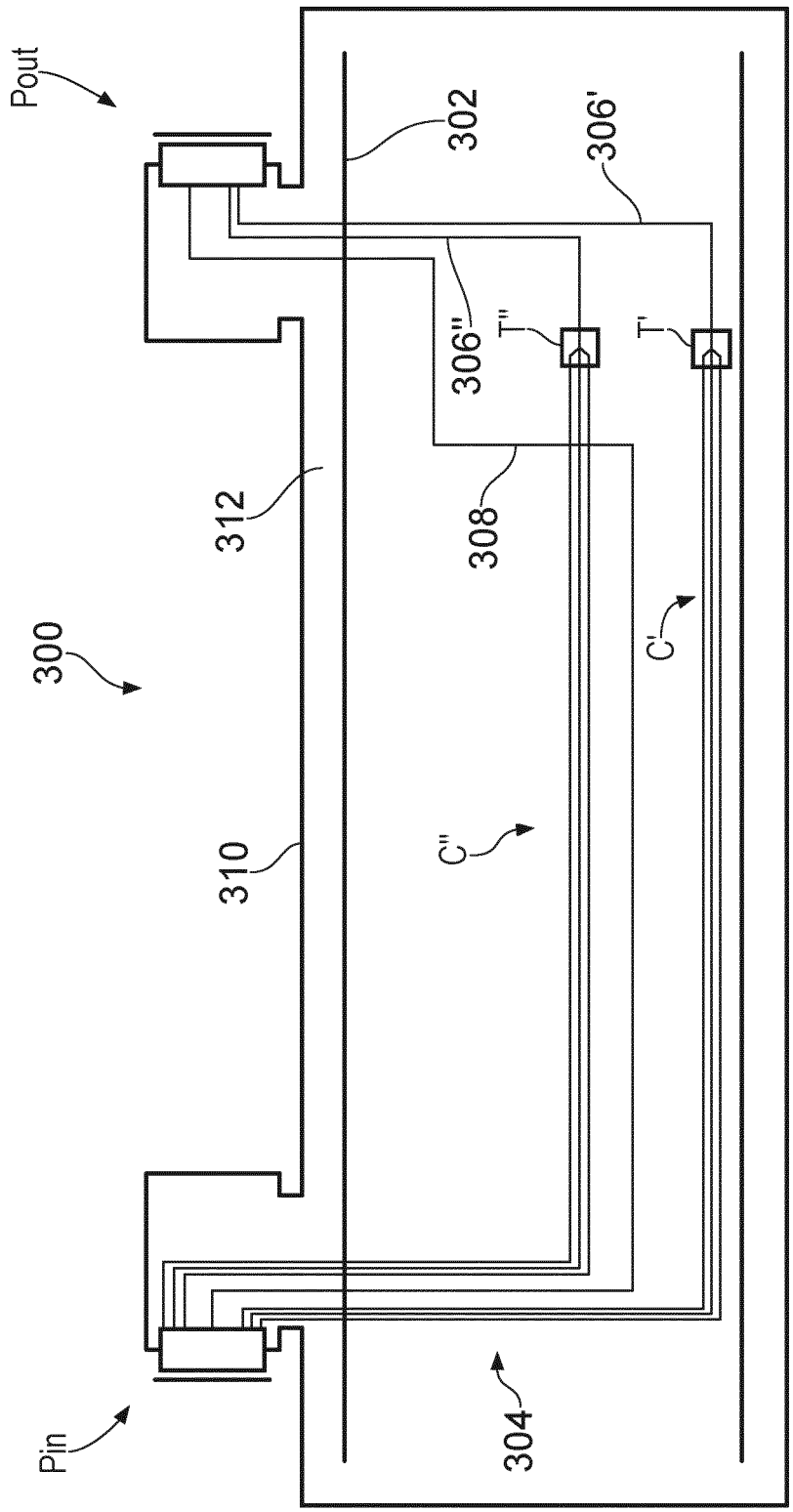
FIG. 3 illustrates, schematically, a subsea flowline system of the hydrocarbon processing system according to FIG. 2.

The subsea flowline system 300, which is disclosed schematically in FIG. 3, comprises a flowline 302 configured to act as a conduit for a hydrocarbon fluid. The flowline system 300 further comprises an electric trace heating system 304 arranged along at least a part-length of the flowline 302. The electric trace heating system 304 is configured to control the temperature of the hydrocarbon fluid flowing in the flowline 302 and comprises a first C' and a second C" trace heating cable. Each trace heating cable C', C" comprises three phase conduits L1', L2', L3'; L1", L2", L3" and extends between a power input connector Pin and a cable termination T', T". In the cable termination T', T", the phase conduits are Y-connected (star-connected) and terminate in a neutral connection point LN', LN".

In the present embodiment only two trace heating cables C', C" are shown. However, more trace heating cables, e.g. four or six trace heating cables, may be present.

In the present embodiment, the subsea flowline system 300 further comprises a signal conduit 308, which may be an optical fibre cable configured to convey temperature readings that are monitored along the length of the flowline 302. In other embodiments the signal conduit 308 may act as a distributed temperature sensor and/or be utilised to convey other monitoring signals relating to the flowline 302, e.g. signals from vibration sensors and/or water ingress sensors arranged along the length of the flowline 302.

In the present embodiment only one signal conduit 308 is shown. However, more signal conduits, e.g. two signal conduit conduits each comprising six or more individual optical fibres, may be present.

In the present embodiment, the subsea flowline system 300 also comprises a carrier pipe 310 arranged substantially coaxially to the flowline 302, thus defining an annular space 312 between the flowline 302 and the carrier pipe 310. The trace heating cables C', C" and the signal conduit 308 may be arranged in the annular space 312, e.g. in a similar manner as is shown in FIG. 1.

The trace heating cables C', C" are configured to actively heat the hydrocarbon fluid flowing in the flowline 302 utilizing the Joule resistive effect. In FIG. 2 this is illustrated by the schematically indicated ohmic resistances $Z_y$. Power for the heating operation is received from the electrical power providing system 200 (see FIG. 2) via the power input connector Pin.

The power input connector Pin and the power output connector Pout may preferably be wet-mate connectors, thus allowing submerged connection and disconnection of the electrical power providing system 200 and the subsea production system 400, respectively.

The electrical power providing system 200 comprises a first power source P' configured to provide power to the first trace heating cable C' and a second power source P" configured to provide power to the second trace heating cable C". The first and second power sources P', P" are three-phase AC power sources and each power source P', P" is Y-connected (star-connected) about a common neutral connection point PN', PN". Consequently, when the electrical power providing system 200 is connected to the flowline system 300, the power sources P', P" and the trace heating cables C', C" form a Y-Y system in which the power sources P', P" can energize the phase conduits L1', L2', L3', L1", L2" and L3" with phase voltages V1', V2', V3', V1", V2" and V3", respectively.

The electrical power providing system 200 further comprises a third power source $P_{SPS}$ configured to provide power to the subsea production system 400. The third power source $P_{SPS}$ is a single-phase AC power source and is connected between the neutral connection points PN', PN" of the first and second power sources P', P", thus allowing the third power source $P_{SPS}$ to create a voltage potential $V_{SPS}$ between the neutral connection points PN', PN" when energized. Consequently, when the electrical power providing system 200 is connected to the flowline system 300 and the third power source $P_{SPS}$ is energized, there will be a corresponding voltage potential $V_N'$-$V_N"$ between the neutral connection points LN' and LN" of the cable terminations T' and T".

The power sources P', P" and $P_{SPS}$ may be positioned top-side, i.e. above sea level, e.g. on a platform, and the electrical power providing system 200 may comprise an umbilical (not shown in the figures) which is connectable to the power input connector Pin of the subsea flowline system 300 to energize the trace heating cables C', C". The umbilical may comprise a signal conduit (not shown) that is connectable to the signal conduit 308 of the flowline system 300, thus allowing signals carried by the signal conduit 308 to be conveyed top-side.

The subsea flowline system 300 comprises a power output connector Pout configured for providing electrical power for powering the subsea hydrocarbon production system 400. The subsea flowline system 300 further comprises a first electrical conduit 306' extending between the neutral connection point LN' of the cable termination T' of the first trace heating cable C' and the power output connector Pout. The subsea flowline system 300 also comprises a second electrical conduit 306" extending between the neutral connection point LN" of the cable termination T" of the second trace heating cable C" and the power output connector Pout.

The first and second electrical conduits 306' and 306" are electrically accessible at the power output connector Pout. This allows power provided by the third power source $P_{SPS}$ to be utilised to power the subsea production system 400. In FIG. 2 this is illustrated by a load $Z_{SPS}$ of the subsea production system 400 being connected to conduits 306' and 306".

Consequently, using the system 100, electrical power can be provided to a connected subsea production system 400 via the trace heating cables C' and C" at the same time as the cables C' and C" are used for their conventional purpose, i.e. to heat the flowline 302.

The signal conduit 308 may also be accessible at the power output connector Pout. This would allow control signals to and from the subsea production system 400 to be routed via the subsea flowline system 300, thus allowing control signals to be conveyed between the subsea production system 400 and a top-side location (provided that the power input connector Pin is connected to an umbilical leading to a top side location).

The subsea production system 400 may be any subsea system or sub-system commonly used in a subsea hydrocarbon production or processing facility, e.g. a subsea control module (SCM), e.g. positioned on a subsea Christmas tree or on a manifold. For example, the subsea production system 400 may comprise a subsea control module (SCM), e.g. positioned on a subsea Christmas tree or on a manifold, which SCM (not shown) is powered and possibly also controlled vis the subsea flowline system 300. The subsea production system 400 may also or alternatively comprise any one of: a subsea pump (not shown); a subsea router module; and a sensor that is powered and possibly also controlled vis the subsea flowline system 300.

As a typical example, the third power source $P_{SPS}$ may operate at $V_{SPS}$=900 VAC and may be rated to provide an output power within the range of 300 to 700 W. However, the output power may depend on the type equipment connected to the power outlet Pout.

In alternative embodiments, the third power source $P_{SPS}$ may be a DC power source. Also, if three trace heating cables are used, a three phase voltage can be transferred to the SPS system.

Figure 4:
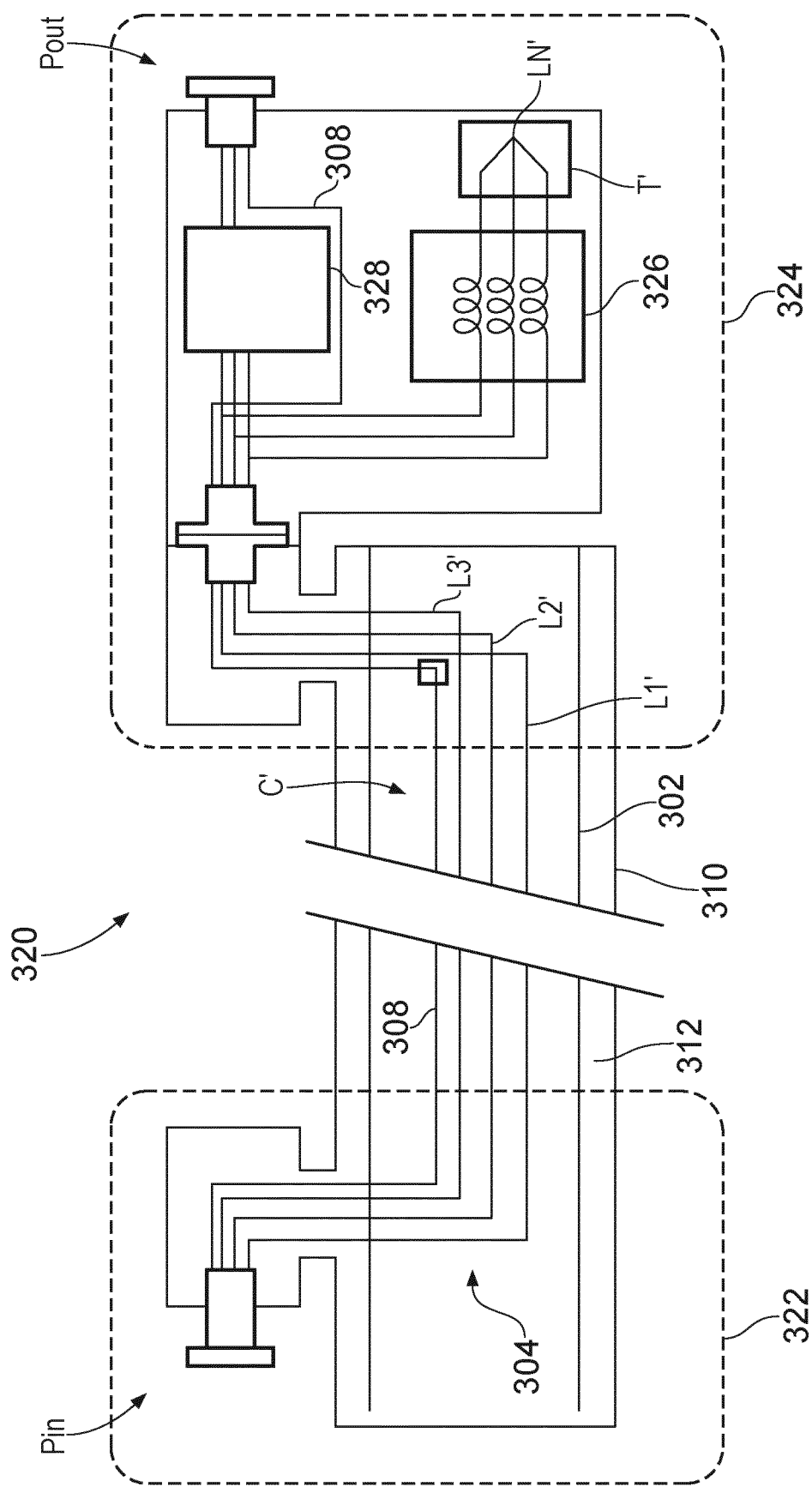
FIGS. 4 and 5 illustrate, schematically, a further embodiment of a hydrocarbon processing system.

FIG. 4 illustrates a further embodiment of a subsea flowline system 320 that can be utilised to provide power between a topside electrical power providing system and a subsea hydrocarbon production system (not shown in FIG. 4).

The subsea flowline system 320 is similar to the above-described system 300 (see FIG. 3) in that it comprises a flowline 302 configured to act as a conduit for a hydrocarbon fluid and an electric trace heating system 304 arranged along at least a part-length of the flowline 302.

The subsea flowline system 320 may comprise a carrier pipe 310 arranged substantially coaxially to the flowline 302, thus defining an annular space 312 between the flowline 302 and the carrier pipe 310. The carrier pipe 310 and the flowline 302 may for example run between a subsea riser base 322 and a subsea pipeline end manifold (PLET) 324.

The electric trace heating system 304 is configured to control the temperature of the hydrocarbon fluid flowing in the flowline 302 and comprises a trace heating cable C'. The trace heating cable C' comprises three phase cables L1', L2', L3' and extends between a power input connector Pin and a cable termination T'. In the cable termination T', the phase conduits are Y-connected (star-connected) and terminate in a neutral connection point LN'.

The trace heating cable C' is configured to actively heat the hydrocarbon fluid flowing in the flowline 302 utilizing the Joule resistive effect and may be arranged in the annular space 312.

The subsea flowline system 320 further comprises a power output connector Pout configured for providing electrical power for powering the subsea hydrocarbon production system.

Figure 5:
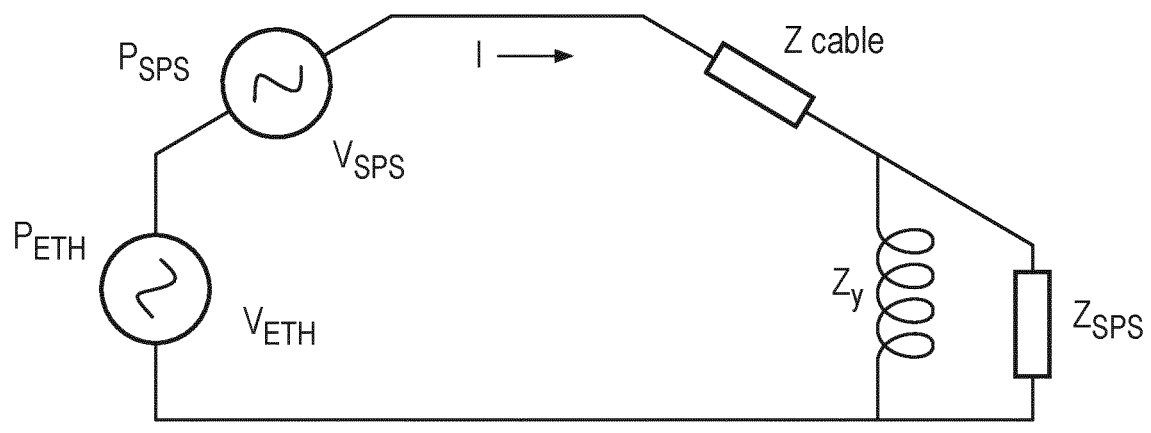
Figure 5:
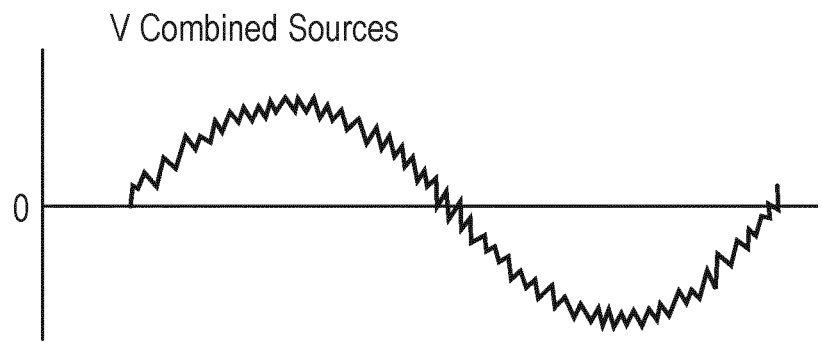

This configuration allows electrical power to be provided to a subsea production system (connected to the power output connector Pout) via the trace heating cable C' at the same time as the cable C' is used for its conventional purpose, i.e. to heat the flowline 302. Two independent topside power sources $P_{ETH}$ and $P_{SPS}$ may be connected to the input power connector Pin (see FIG. 5)—power source $P_{ETH}$ configured to power the electric trace heating system 304 and power source $P_{SPS}$ configured to power the subsea production system connected to the power output connector Pout.

The two power sources $P_{ETH}$ and $P_{SPS}$ may be configured to operate at different frequencies, e.g. $P_{ETH}$ may be configured to provide a voltage $V_{ETH}$ having a first frequency, e.g. approximately 50 Hz, and $P_{SPS}$ may be configured to provide a voltage $V_{SPS}$ having a second frequency that is higher than the first frequency, e.g. approximately 500 Hz. The cable termination T' may be connected to the rest of the trace heating cable C' via a high frequency pass filter 326 tuned to accept the voltage $V_{ETH}$ but depress the voltage $V_{SPS}$.

The system 320 may comprise a conditioning unit 328 configured to condition the power provided by the power source $P_{SPS}$. For example, the conditioning unit 328 may be configured to rectify the voltage $V_{SPS}$ or shape its wave-form prior to the power provided by the power source $P_{SPS}$ being made available at the power output connector Pout.

Consequently, the system 320 allows the two power sources $P_{ETH}$ and $P_{SPS}$ to independently and separately power the electric trace heating and subsea production system loads using the same transmission cable, e.g. C', but operating at different frequencies, and filters are used to "split" trace heating power from subsea production system power.

Control signals may be conveyed between the connectors Pin and Pout via a dedicated signal conduit 308 provided in parallel to the trace heating cable C' and arranged accessible at the power output connector Pout. The signal conduit 308 may be an optical fibre cable.

The power input connector Pin and the power output connector Pout may preferably be wet-mate connectors, thus allowing submerged connection and disconnection of the electrical power providing system and the subsea production system, respectively.

Figure 6:
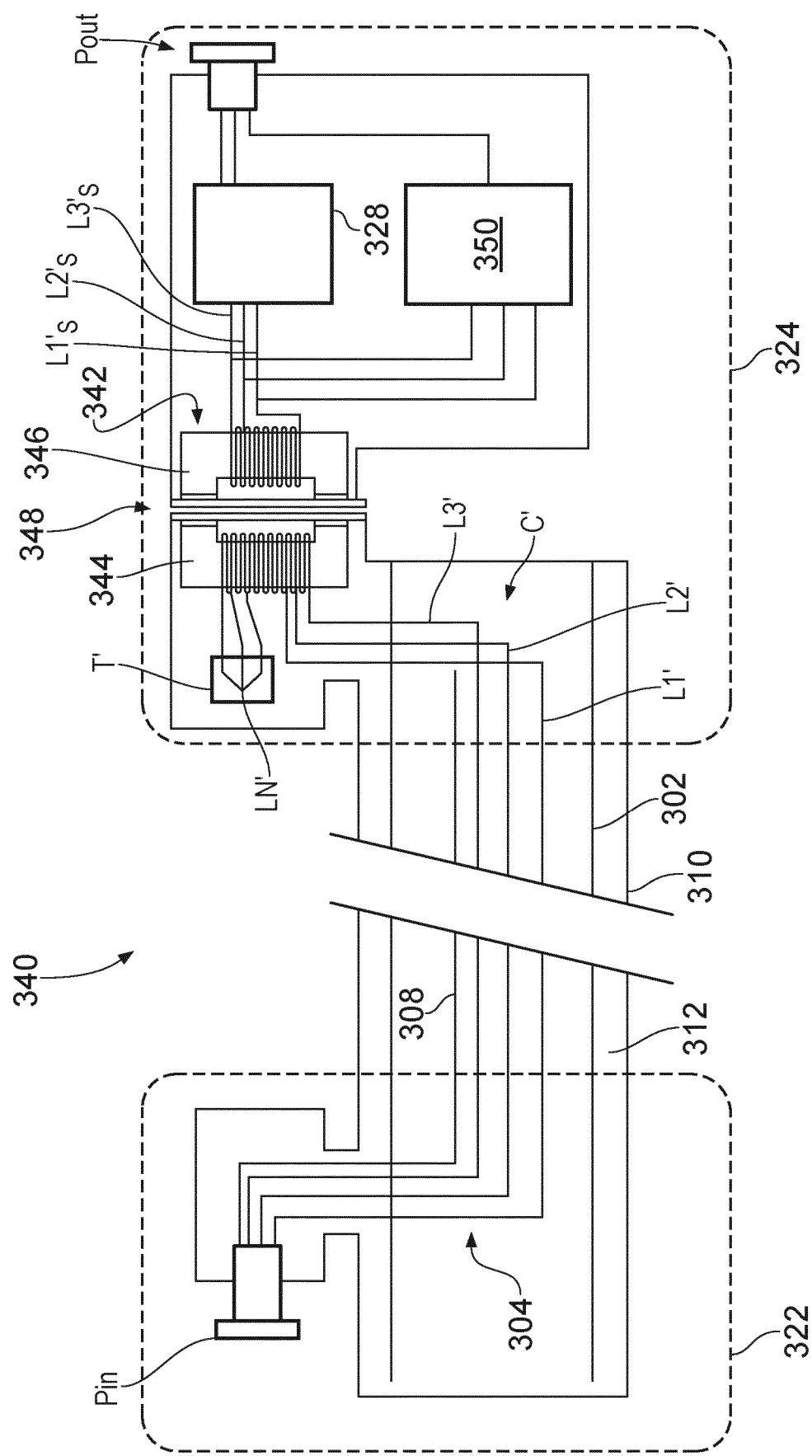
FIG. 6 illustrate, schematically, yet a further embodiment of a hydrocarbon processing system.

FIG. 6 illustrates a further embodiment of a subsea flowline system 340 that can be utilised to provide power between a topside electrical power providing system and a subsea hydrocarbon production system (not shown in FIG. 6).

The subsea flowline system 340 is similar to the above-described system 300 (see FIG. 3) in that it comprises a flowline 302 configured to act as a conduit for a hydrocarbon fluid and an electric trace heating system 304 arranged along at least a part-length of the flowline 302.

The subsea flowline system 340 may comprise a carrier pipe 310 arranged substantially coaxially to the flowline 302, thus defining an annular space 312 between the flowline 302 and the carrier pipe 310. The carrier pipe 310 and the flowline 302 may for example run between a subsea riser base 322 and a subsea pipeline end manifold (PLET) 324.

The electric trace heating system 304 is configured to control the temperature of the hydrocarbon fluid flowing in the flowline 302 and comprises a trace heating cable C'. The trace heating cable C' comprises three phase cables L1', L2', L3' and extends between a power input connector Pin and a cable termination T'. In the cable termination T', the phase conduits are Y-connected (star-connected) and terminate in a neutral connection point LN'.

The trace heating cable C' is configured to actively heat the hydrocarbon fluid flowing in the flowline 302 utilizing the Joule resistive effect and may be arranged in the annular space 312.

The subsea flowline system 340 further comprises a power output connector Pout configured for providing electrical power for powering the subsea hydrocarbon production system.

However, unlike the trace heating cable C' in system 300 (see FIG. 3), the trace heating cable C' in system 340 is galvanically isolated from the power output connector Pout by means of a transformer 342. The transformer 342 comprises a primary core 344 and a secondary core 346 magnetically coupled to each other. The primary and secondary cores 344, 346 may be separated by a barrier 348 made from a low magnetic permeability material.

The phase cables L1', L2' and L3' of the trace heating cable C' are wound around the primary core 344 and corresponding secondary phase cables $L1'_s$, $L2'_s$ and $L3'_s$ are wound around the secondary core 346. The secondary phase cables $L1'_s$, $L2'_s$ and $L3'_s$ are connected to the power output connector Pout, thus allowing electrical power to be provided from the topside electrical power providing system (connected to the power input connector Pin) to the subsea hydrocarbon production system (connected to the power output connector Pout) via the trace heating cable C'.

This configuration allows electrical power to be provided to a subsea production system (connected to the power output connector Pout) via the trace heating cable C' at the same time as the cable C' is used for its conventional purpose, i.e. to heat the flowline 302. Similar to system 320, the system 340 may comprise a conditioning unit 328 configured to condition the power made available at the power output connector Pout.

Control signals can be conveyed between the connectors Pin and Pout via the primary phase cables L1', L2' and L3', and a signal filter unit 350 positioned between the secondary phase cables L1'$_s$, L2'$_s$ and L3'$_s$ and the power output connector Pout can be arranged to filter and extract the control signals conveyed via the secondary phase cables L1'$_s$, L2'$_s$ and L3'$_s$. Alternatively, or in addition, a dedicated signal conduit 308 can be provided in parallel to the trace heating cable C' and arranged accessible at the power output connector Pout. The signal conduit 308 may be an optical fibre cable.

The power input connector Pin and the power output connector Pout may preferably be wet-mate connectors, thus allowing submerged connection and disconnection of the electrical power providing system and the subsea production system, respectively.

In the preceding description, various aspects of the apparatus according to the invention have been described with reference to the illustrative embodiment. For purposes of explanation, specific numbers, systems and configurations were set forth in order to provide a thorough understanding of the apparatus and its workings. However, this description is not intended to be construed in a limiting sense. Various modifications and variations of the illustrative embodiment, as well as other embodiments, may lie within the scope of the present invention as defined by the following claims.

The invention claimed is:

1. A subsea hydrocarbon flowline system comprising:
   a hydrocarbon flowline;
   an electric trace heating system arranged along at least a part-length of the flowline to control the temperature of hydrocarbon fluid flowing in the flowline; and
   a power input connector (Pin) configured for receiving electrical power from an electrical power providing system for powering the electric trace heating system;
   wherein the electric trace heating system comprises a first three-phase trace heating cable (C') and a second three-phase trace heating cable (C"), each trace heating cable (C'; C") comprising three phase conduits (L1', L2', L3'; L1", L2", L3") and extending between the power input connector (Pin) and a cable termination (T'; T") at which the phase conduits (L1', L2', L3'; L1", L2", L3") are Y-connected and terminate in a neutral connection point (LN'; LN"); and
   wherein the flowline system further comprises:
   a power output connector (Pout) for providing electrical power to a subsea hydrocarbon production system;
   a first electrical conduit extending between the neutral connection point (LN') of the cable termination (T') of the first trace heating cable (C') and the power output connector (Pout); and
   a second electrical conduit extending between the neutral connection point (LN") of the cable termination (T") of the second trace heating cable (C") and the power output connector (Pout);
   wherein the first and the second electrical conduits are electrically accessible at the power output connector (Pout) for powering the subsea hydrocarbon production system.

2. The flowline system according to claim 1, further comprising:
   a signal conduit for providing control signals to and receiving control and/or monitoring signals from the subsea hydrocarbon production system;
   wherein the signal conduit extends between and is accessible at the power input connector (Pin) and the power output connector (Pout).

3. The flowline system according to claim 1, wherein the trace heating cables (C', C") are utilised to provide control signals to and receive control and/or monitoring signals from the subsea hydrocarbon production system.

4. The flowline system (300) according to claim 1, further comprising:
   a carrier pipe in which the flowline is arranged;
   wherein the first and second three-phase trace heating cables (C'; C") are arranged in an annular space formed between the flowline and the carrier pipe.

5. A hydrocarbon processing system comprising:
   a flowline system according to any one of claims 1-4;
   an electrical power providing system connected to said power input connector (Pin) for providing electrical power to said electric trace heating system; and
   a subsea production system connected to said power output connector (Pout);
   wherein the subsea production system is configured for receiving electrical power from the electrical power providing system via said first and second electrical conduits.

6. A method of providing electrical power to a subsea hydrocarbon production system, the method comprising the steps of:
   arranging a flowline system according to any one of claims 1-4 subsea;
   connecting the power input connector (Pin) of the flowline system to an electrical power providing system;
   connecting the subsea hydrocarbon production system to the power output connector (Pout) of the flowline system; and
   providing electrical power to the subsea hydrocarbon production system from the electrical power providing system via the trace heating cables (C', C") of the flowline system.

7. The method according to claim 6, further comprising the step of providing control signals to and receiving control and/or monitoring signals from the subsea hydrocarbon production system via a signal conduit extending between and being accessible at the power input connector (Pin) and the power output connector (Pout).

8. A hydrocarbon processing system comprising:
   a flowline system comprising:
      a hydrocarbon flowline;
      an electric trace heating system arranged along at least a part-length of the flowline to control the temperature of hydrocarbon fluid flowing in the flowline; and
      a power input connector (Pin);
      wherein the electric trace heating system comprises a first three-phase trace heating cable (C') and a second three-phase trace heating cable (C"), each trace heating cable (C'; C") comprising three phase conduits (L1', L2', L3'; L1", L2", L3") and extending between the power input connector (Pin) and a cable termination (T'; T") at which the phase conduits (L1', L2', L3'; L1", L2", L3") are Y-connected and terminate in a neutral connection point (LN'; LN");

a power output connector (Pout) for providing electrical power to a subsea hydrocarbon production system;

a first electrical conduit extending between the neutral connection point (LN') of the cable termination (T') of the first trace heating cable (C') and the power output connector (Pout); and a second electrical conduit extending between the neutral connection point (LN") of the cable termination (T") of the second trace heating cable (C") and the power output connector (Pout);

wherein the first and the second electrical conduits are electrically accessible at the power output connector (Pout) for powering the subsea hydrocarbon production system;

an electrical power providing system connected to said power input connector (Pin) for providing electrical power to said electric trace heating system; and a subsea production system connected to said power output connector (Pout);

wherein the subsea production system is configured for receiving electrical power from the electrical power providing system via said first and second electrical conduits; and wherein the electrical power providing system comprises:

a first three-phase power source (P') for powering the first three-phase cable (C'), wherein the first power source (P') is configured to form a Y-Y connection with the first trace heating cable (C');

a second three-phase power source (P") for powering the second three-phase cable (C"), the second power source (P") being configured to form a Y-Y connection with the second trace heating cable (C"); and a single-phase power source ($P_{SPS}$) arranged between neutral connection points (PN'; PN") of the first and second three-phase power sources (P', P").

9. The hydrocarbon processing system according to claim 8, wherein the first trace heating cable (C') is configured for operating at a first neutral voltage level ($V_N'$) and the second trace heating cable (C") is configured for operating at a second neutral voltage level ($V_N''$) being different from the neutral voltage level ($V_N'$) of the first trace heating cable (C').

10. The hydrocarbon processing system according to claim 9, wherein a difference between the neutral voltage level ($V_N'$) of the first trace heating cable (C') and the neutral voltage level ($V_N''$) of the second trace heating cable (C") is an AC voltage ($V_{SPS}$) or a DC voltage.

11. The hydrocarbon processing system according to claim 8, wherein the flowline system further comprises:

a signal conduit for providing control signals to and receiving control and/or monitoring signals from the subsea hydrocarbon production system;

wherein the signal conduit extends between and is accessible at the power input connector (Pin) and the power output connector (Pout).

12. The hydrocarbon processing system according to claim 8, wherein the trace heating cables (C', C") are utilised to provide control signals to and receive control and/or monitoring signals from the subsea hydrocarbon production system.

13. The hydrocarbon processing system according to claim 8, wherein the flowline system further comprises:

a carrier pipe in which the flowline is arranged;

wherein the first and second three-phase trace heating cables (C'; C") are arranged in an annular space formed between the flowline and the carrier pipe.

14. Use of first and second three-phase trace heating cables (C', C") of an electrical trace heating system of a subsea hydrocarbon flowline system for powering a subsea hydrocarbon production system connected to a power output connector (Pout) of the subsea hydrocarbon flowline system, the subsea hydrocarbon flowline system comprising:

a hydrocarbon flowline;

the electric trace heating system being arranged along at least a part-length of the flowline to control the temperature of hydrocarbon fluid flowing in the flowline; and a power input connector (Pin) configured for receiving electrical power from an electrical power providing system for powering the electric trace heating system;

wherein each trace heating cable (C'; C") comprises three phase conduits (L1', L2', L3'; L1", L2", L3") and extends between the power input connector (Pin) and a cable termination (T'; T") at which the phase conduits (L1', L2', L3'; L1", L2", L3") are Y-connected and terminate in a neutral connection point (LN'; LN"); and wherein the flowline system further comprises:

a first electrical conduit extending between the neutral connection point (LN') of the cable termination (T') of the first trace heating cable (C') and the power output connector (Pout); and a second electrical conduit extending between the neutral connection point (LN") of the cable termination (T") of the second trace heating cable (C") and the power output connector (Pout);

wherein the first and the second electrical conduits are electrically accessible at the power output connector (Pout) for powering the subsea hydrocarbon production system.

* * * * *